US007634274B2

(12) United States Patent
Hurtta

(10) Patent No.: US 7,634,274 B2
(45) Date of Patent: Dec. 15, 2009

(54) CONNECTION ESTABLISHMENT FOR PDP CONTEXTS

(75) Inventor: Tuija Hurtta, Espoo (FI)

(73) Assignee: Nokia Corporation, Espoo (FI)

( * ) Notice: Subject to any disclaimer, the term of this patent is extended or adjusted under 35 U.S.C. 154(b) by 186 days.

(21) Appl. No.: 10/331,943

(22) Filed: Dec. 31, 2002

(65) Prior Publication Data

US 2004/0127237 A1 Jul. 1, 2004

(51) Int. Cl.
*H04W 72/00* (2009.01)
*H04L 1/00* (2006.01)
(52) U.S. Cl. ............... 455/450; 455/452.2; 370/235
(58) Field of Classification Search ......... 455/450, 455/452.1–452.2, 466, 550.1, 455
See application file for complete search history.

(56) References Cited

U.S. PATENT DOCUMENTS

| | | | | |
|---|---|---|---|---|
| 6,618,591 B1 * | 9/2003 | Kalliokulju et al. | ...... | 455/452.2 |
| 6,621,807 B1 * | 9/2003 | Jung et al. | ...... | 370/335 |
| 6,654,610 B1 * | 11/2003 | Chen et al. | ...... | 455/450 |
| 6,747,989 B1 | 6/2004 | Sevanto | | |
| 6,810,259 B1 * | 10/2004 | Zhang | ...... | 455/456.5 |
| 7,106,718 B2 * | 9/2006 | Oyama et al. | ...... | 370/340 |
| 2002/0120749 A1 * | 8/2002 | Widegren et al. | ...... | 709/227 |
| 2003/0060210 A1 * | 3/2003 | Ravishankar et al. | ...... | 455/452 |
| 2003/0186651 A1 * | 10/2003 | Weston et al. | ...... | 455/39 |

FOREIGN PATENT DOCUMENTS

| | | |
|---|---|---|
| EP | 1 096 742 A1 | 5/2001 |
| WO | WO 00/64203 | 10/2000 |
| WO | WO 02/37753 A2 | 5/2002 |
| WO | WO 02/067605 A1 | 8/2002 |

* cited by examiner

*Primary Examiner*—Vincent P Harper
*Assistant Examiner*—Marivelisse Santiago-Cordero
(74) *Attorney, Agent, or Firm*—Harrington & Smith, PC

(57) ABSTRACT

There is disclosed a method and apparatus for establishing multiple PDP contexts in a mobile communication system. The method comprises determining the number of PDP context requests required. Preferably this step is performed by the UE. The method comprises receiving all the required PDP context requests. This step is preferably performed in the network, i.e. in the SGSN and/or the GGSN. The method comprises establishing radio access resources for all the PDP context requests. This step is preferably initiated by the SGSN, and the RNC then preferably allocates the radio access resources based on SGSN requests.

9 Claims, 3 Drawing Sheets

CONNECTION ESTABLISHMENT FOR PDP CONTEXTS

FIELD OF THE INVENTION

The present invention relates to the establishment of connections between a user equipment and a communication network, and particularly but not exclusively to the establishment of PDP contexts.

BACKGROUND OF THE INVENTION

An application session, e.g. an IP (Internet protocol) multimedia session may consist of multiple media components, for example video, voice and data. In the communication network specified by 3GPP, each media component may require a PDP context of its own. This requires a user equipment (UE) to activate multiple PDP contexts for an application session consisting of multiple media components.

There has been a suggestion in the art that there should be provided the flexibility to allow multiplexing of multiple media components onto a single PDP context. Such multiplexing would theoretically allow a single PDP context for all media components which have similar requirements for the PDP context, e.g. similar quality of service requirements.

However, even if a multiplexing solution was implemented, a user equipment must activate multiple PDP contexts e.g. if the quality of service requirements of the media components of an application session are different. For example, an IP multimedia session consisting of video, voice and data would most likely require three distinct qualities of service levels, which in turn requires three PDP contexts.

It is an object of the present invention to provide an improved technique in which one or more of the above-stated problems are addressed.

SUMMARY OF THE INVENTION

According to the present invention there is provided a method of establishing multiple connections between a user equipment and a communications network over a radio interface, comprising the step of establishing the radio access resources for the multiple connections in a single step.

The multiple connections may correspond to bearers having different levels of service. The multiple connections may correspond to bearers carrying different media components. The media components may include one or more of video, voice or data. The radio access resources may be radio access bearers.

The method may further comprise receiving a request for the multiple connections. The request is at least one PDP context request. The method may further comprise receiving a request for the multiple connections in a single step.

The request may be one of: an activate PDP context request identifying multiple PDP contexts; an activate secondary PDP context request identifying multiple PDP contexts; a modify PDP context request identifying multiple PDP contexts; a deactivate PDP context request identifying multiple PDP contexts.

A create PDP context request identifying multiple PDP contexts may be created responsive to the request. A create PDP context response identifying multiple PDP contexts may be created responsive to the create PDP context request. The radio access resources may be established responsive to the create PDP context response. An activate PDP context accept identifying multiple PDP contexts may be created following establishment of the radio access resources.

The method may further comprise receiving requests for the multiple connections in corresponding multiple successive steps. Each request may be an activate PDP context request identifying a PDP context.

Each request may be one of: an activate secondary PDP context request identifying a PDP context; a modify PDP context request identifying a PDP context; a deactivate PDP context request identifying a PDP context.

The activate request may include an indication of whether a further request follows. The further request may be the corresponding one of: an activate secondary PDP context request identifying a PDP context; a modify PDP context request identifying a PDP context; a deactivate PDP context request identifying a PDP context. A create PDP context request may be created responsive to each successive request. The create PDP context request may include an indication of whether a further PDP context request follows. The further request may be one of: an activate secondary PDP context request identifying a PDP context; a modify PDP context request identifying a PDP context; a deactivate PDP context request identifying a PDP context. A create PDP context response may be created responsive to each successive create PDP context request. The create PDP context response may include an indication of whether a further PDP context response follows. The further response may be one of: an activate secondary PDP context request identifying a PDP context; a modify PDP context request identifying a PDP context; a deactivate PDP context request identifying a PDP context. The radio access resources may be established responsive to receipt of all successive PDP context responses. Successive activate PDP context accepts may be created following establishment of the radio access resources.

In a further aspect the present invention provides a method of establishing multiple PDP contexts in a mobile communication system. The method comprises determining the number of PDP context requests required. Preferably this step is performed by the UE. The method comprises receiving all the required PDP context requests. This step is preferably performed in the network, i.e. in the SGSN and/or the GGSN. The method comprises establishing radio access resources for all the PDP context requests. This step is preferably initiated by the SGSN, and the RNC then preferably allocates the radio access resources based on SGSN requests.

In accordance with further aspects of the invention there is provided means adapted to perform the method steps defined herein.

BRIEF DESCRIPTION OF THE DRAWINGS

For a better understanding of the present invention and as to how the same can be carried into effect, reference will now be made by way of example to the accompanying drawings in which.

DESCRIPTION OF PREFERRED EMBODIMENTS

The present invention is described herein with reference to a particular illustrative embodiment. However, such embodiment is presented for the purposes of illustrating the present invention, and does not limit the scope thereof.

The present invention is described herein by way of reference to an example implementation in a 3G UMTS (universal mobile telecommunication system) network. One skilled in the art will appreciate, however, from reading the following description that the present invention is not limited in its broad applicability to such an implementation.

Figure 1:
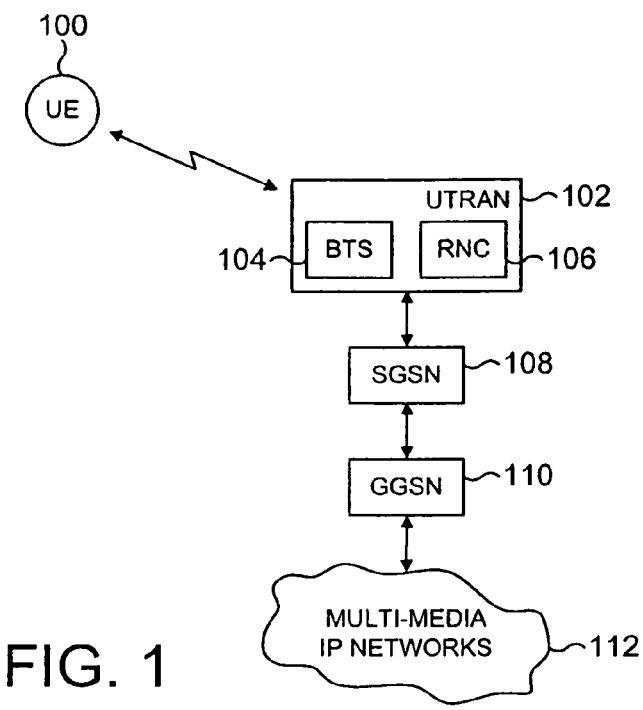
FIG. 1 illustrates an exemplary network scenario within which embodiments of the present invention may be implemented.

Referring to FIG. 1, there is illustrated the main elements of a UMTS network, necessary for understanding embodiments of the present invention. It should be noted that FIG. 1 does not represent a full implementation of a UMTS network, which implementation will be familiar to one skilled in the art. Rather FIG. 1 represents some of the main elements of such a UMTS network necessary for placing the present invention into an appropriate context.

A user equipment (UE) 100 communicates over a radio interface with a UTRAN (UMTS radio access network) 102. As is known in the art, the UTRAN 102 includes a base transceiver station (BTS) 104 and a radio network controller (RNC) 106. In the UMTS network the UTRAN 102 is connected to a serving GPRS support node (SGSN) 108, which in turn is connected to a gateway GPRS support node (GGSN) 110. The GGSN 110 is further connected to at least one external network, e.g. multimedia IP network, represented by reference numeral 112 in FIG. 1. Both the SGSN and the GGSN may be considered to be network elements.

In general terms, a PDP context is activated in order to establish a logical connection between a user equipment and the GGSN.

In known implementations, the UE 100 initiates a logical connection by requesting a PDP context activation by transmitting session management messages to the SGSN 108 via the UTRAN 102. Responsive thereto, the SGSN 108 requests RAB (radio access bearer) establishment from the RNC 106 using the radio access network application protocol (RANAP). The SGSN 108 also requests PDP context creation with GPRS tunneling protocol (GTP) from the GGSN 110. This procedure is repeated for each PDP context which the UE 100 requires.

As well as requesting PDP context activation, the UE 100 may also request secondary PDP context activations, PDP context modifications, or PDP context deactivations. The specific implementation of PDP context activations, secondary PDP context activations, PDP context modifications, and PDP context deactivations is well known in the art.

Figure 2:
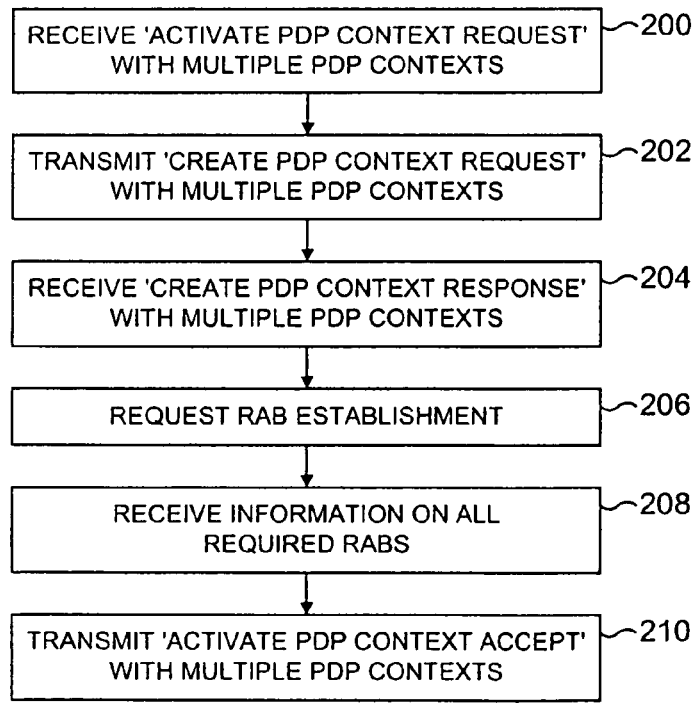
FIG. 2 illustrates the method steps in a first embodiment of the present invention.

A first embodiment of the present invention is now described with reference to FIGS. 2 and 3. FIG. 2 illustrates a flowchart for the procedures followed in the exemplary embodiment, and FIG. 3 illustrates the signaling flow in the exemplary embodiment.

In accordance with the first embodiment of the present invention, the activation (or modification) of multiple PDP contexts is provided for by a single session management message and a single GTP message. In this way, the UE 100 indicates all required PDP contexts at the same time to the SGSN 108. The SGSN 108 can also request creation of all required PDP contexts at the same time from the GGSN 110. Advantageously, the SGSN 108 does not have to perform multiple RAB establishment procedures corresponding to multiple PDP context activations, which saves time when activating the required PDP context.

Figure 3:
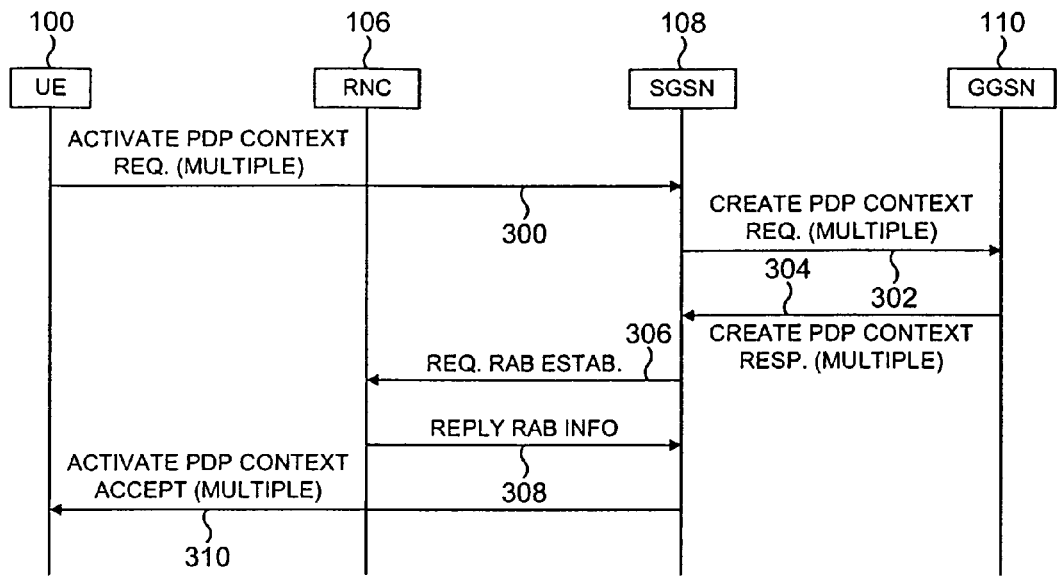
FIG. 3 illustrates the signaling between network elements in a first embodiment of the present invention.

Referring to FIG. 3, as represented by signal 300 the UE 100 transmits an activate PDP context request to the SGSN 108, through the UTRAN 102. In accordance with the first embodiment of the present invention, the activate PDP context request includes multiple PDP context requests. As represented by step 200 in FIG. 2, the SGSN receives the activate PDP context request with multiple PDP contexts.

In this embodiment, the activate PDP context request session management message comprises e.g. the following parameters for the PDP context:
NSAPI
TI
PDP Type
PDP Address
Access Point Name
QoS Requested
PDP Configuration Options TFT may also be included when, for example, a secondary PDP context is activated or when a PDP context is modified. TFT is not included, however, in the activate PDP context request message which is used to activate a primary PDP context.

All these parameters are known in a standard activate PDP context request session management message. In addition, the message is adapted to further include parameters for each required additional PDP context, e.g.:
NSAPI 2
TI 2
QoS Requested 2
PDP Configuration Options 2
TFT 2
NSAPI 3
TI 3
QoS Requested 3
PDP Configuration Options 3
TFT 3

Thus, in this embodiment, the activate PDP context request contains the details of three PDP contexts requested by the UE 100, being all the PDP contexts desired by the UE 100. In other embodiments the activate PDP context request may, in accordance with this embodiment of the present invention, generally identify two or more PDP contexts.

Responsive to the activate PDP context request, as represented by step 202 the SGSN 108 transmits a create PDP context request GTP message 302 to the GGSN 110. The create PDP context request contains, in accordance with the embodiment of the invention, the identity of multiple PDP contexts. In accordance with known procedures, the create PDP context request message 302 includes e.g. the following parameters for the PDP context:
NSAPI
PDP Type
PDP Address
Access Point Name
QoS Profile
PDP Configuration Options
SGSN Address Data
SGSN Address Signaling
TEID Data
TEID Signaling
MSISDN
Charging Characteristics Not all PDP context parameters are listed. The full list of PDP context parameters can be found from 3GPP specifications, and the list may even be different e.g. in 3GPP Rel5 than in 3GPP Rel4, because new parameters may be added in later releases. The above parameters are included as examples only.

In addition, in accordance with this embodiment of the invention the create PDP context request also includes e.g. the following parameters:
NSAPI2
QoS Profile 2
PDP Configuration Options 2
SGSN Address Data 2
SGSN Address Signaling 2
TEID Data 2
TEID Signaling 2
Charging Characteristics 2
TFT 2
NSAPI 3
QoS Profile 3
PDP Configuration Options 3
SGSN Address Data 3
SGSN Address Signaling 3
TEID Data 3
TEID Signaling 3
Charging Characteristics 3
TFT 3

Thus the GGSN 110 similarly receives the details of all three of the PDP contexts requested in a single message.

Responsive to the create PDP context request message 302, the GGSN 110 sends a create PDP context response message 304 to the SGSN 108. As is known, this message includes e.g.:
PDP Address
QoS Profile
PDP Configuration Options
GGSN Address Data
GGSN Address Signalling
TEID Data
TEID Signaling
Charging ID
Cause In addition, in accordance with this embodiment of the invention the create PDP context response message 304 also includes e.g.:
QoS Profile 2
PDP Configuration Options 2
GGSN Address Data 2
GGSN Address Signaling 2
TEID Data 2
TEID Signaling 2
Charging ID 2
Cause 2
QoS Profile 3
PDP Configuration Options 3
GGSN Address Data 3
GGSN Address Signaling 3
TEID Data 3
TEID Signaling 3
Charging ID 3
Cause 3

The receipt of the create PDP context response message 304 by the SGSN 108 is represented in FIG. 2 by step 204.

In a step 206, the SGSN 108 requests RAB establishment with a message 306 to the RNC 106. The request message 306 includes information identifying all required RABs. Responsive thereto, the SGSN 108 receives from the RNC 106 a response message 308, as denoted by step 208, providing information on all required RABs.

Thus, RAB establishment for all PDP contexts takes place in a single step.

Thereafter, the SGSN 108 transmits an activate PDP context accept message 310 to the UE 100, as represented by step 210. As is known, the activate PDP context accept message 310 includes e.g.:
TI
PDP Type
PDP Address
QoS Profile
Radio Priority
Packet Flow ID
PDP Configuration Options
Cause In addition, in accordance with this embodiment of the invention the activate PDP context accept further includes e.g.:
TI 2
QoS Profile 2
Radio Priority 2
Packet Flow ID 2
PDP Configuration Options 2
Cause 2
TI 3
QoS Profile 3
Radio Priority 3
Packet Flow ID 3
PDP Configuration Options 3
Cause 3

Thus in the first described embodiment of the present invention, multiple PDP contexts are identified in all messages between the UE, the SGSN and the GGSN. Advantageously, therefore, at the time that the SGSN has to request RAB establishment for the first PDP context, the SGSN is able to provide the RNC with a request for all RAB establishments.

As a consequence, the amount of signaling messages and thus the amount of traffic are reduced in the radio interface.

Figure 4:
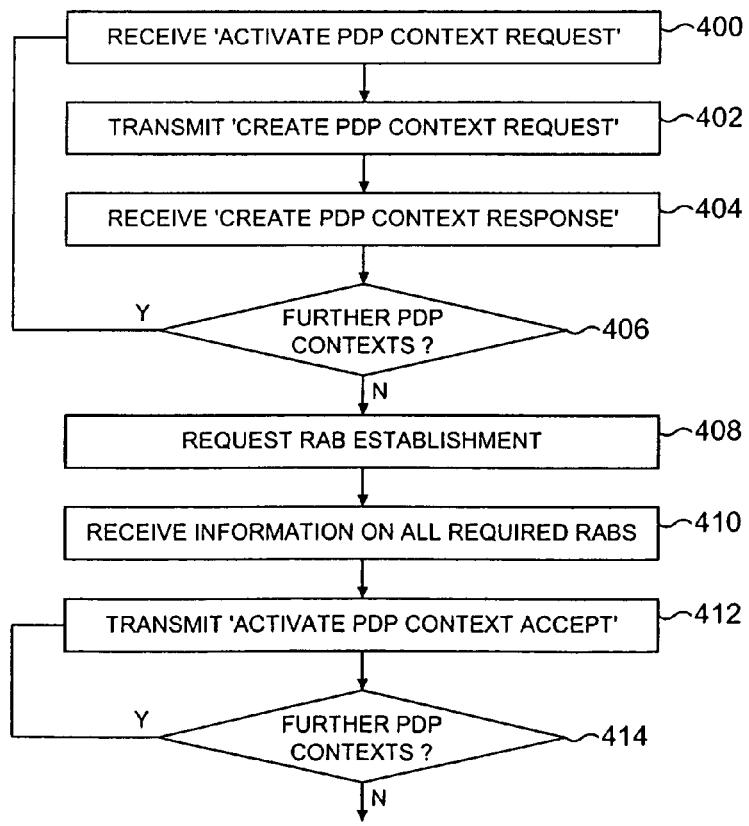
FIG. 4 illustrates the method steps in a second embodiment of the present invention.
Figure 5:
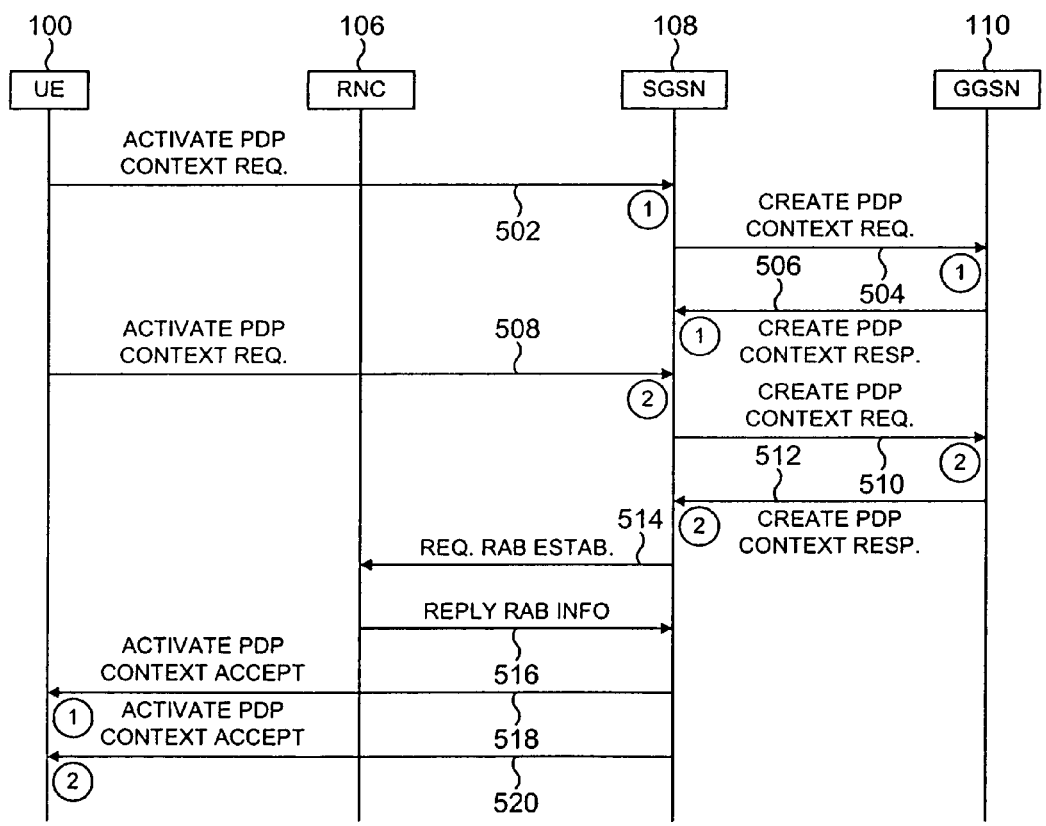
FIG. 5 illustrates the signaling between network elements in a second embodiment of the present invention

A second embodiment of the present invention is now described by way of reference to the flowchart of FIG. 4 and the signaling diagram of FIG. 5. Referring to FIG. 5, as represented by signal 502 the UE 100 sends an activate PDP context request message to the SGSN 108 in accordance with conventional techniques. The receipt of the message 502 is represented in FIG. 4 by step 400. In step 402 the SGSN 108 then forwards a create PDP context request message 504 to the GGSN 110, again in accordance with conventional techniques. The GGSN 110 then replies to the SGSN 108 with a create PDP context response message 506, again in accordance with conventional techniques. The receipt of such message by the SGSN 108 is represented in FIG. 4 by step 404.

In accordance with the second embodiment of the present invention, the activate PDP context request message 502 is adapted to include a flag to indicate whether any further PDP context requests are required by the UE 100. In a step 406, the SGSN 108 determines whether further PDP context requests are expected, based on the setting of the appropriate flag in the previous activate PDP context request.

In the present case, it is assumed that the UE 100 wishes to establish two PDP context requests. In step 406 therefore the SGSN returns to step 400, and receives a further activate PDP context request message 508. As before, the SGSN 108 sends a create PDP context request message 510 to the GGSN 110, which replies with a create PDP context response message 512 to the SGSN 108.

On this occasion, in step 406, the SGSN 108 determines that there are no further PDP contexts requested, and moves on to step 408. In step 408 the SGSN 108 requests RAB establishment with the RNC 106, as represented by the request RAB establishment message 514. Thereafter, in a step 410, the SGSN 108 receives information on all required RABs in a step 410, as represented by the reply RAB information message 516.

After RAB establishment, in a step 412 the SGSN 108 transmits activate PDP context accept messages to the UE 100. An accept message is transmitted for each original PDP context request message received from the UE 100. In a step 412 the SGSN transmits the activate PDP context accept message 518. In a step 414 the SGSN 108 determines whether further PDP context have been established. Step 412 is then repeated and a further activate PDP context accept message 520 is transmitted to the UE 100. Thereafter, all PDP contexts are established.

Thus the second embodiment of the present invention, described hereinabove with reference to FIGS. 4 and 5, utilizes existing session management procedures between the UE 100 and the SGSN 108, and existing GTP procedures between the SGSN 108 and the GGSN 110. Such existing procedures include PDP context activation, secondary PDP context activation, PDP context modification, and PDP context deactivation. Using the techniques of the second embodiment, the existing procedures are modified merely to add a flag to the existing session management message transmitted from the UE 100 to the SGSN 108. This flag is a "more PDP context requests" flag, which indicates to the SGSN that it should wait before initiating RAB establishment. In the preferred embodiment, the SGSN thus waits until it receives an activate PDP context request from the UE 100 which does not have the flag set, indicating that no further requests are expected. All RABs are then established in a single procedure.

As well as adapting the session management message from the UE 100 to the SGSN 108, the second embodiment of the present invention requires the logic of the SGSN 108 to be adapted. Otherwise, existing session management and GTP messages are used. With the adapted logic, the SGSN 108 does not initiate RAB establishment immediately when receiving a session management request (i.e. an activate PDP context request), but waits until all requests are received based on the flag indication.

In this way, the SGSN does not initiate multiple RAB establishment procedures towards the RNC, but rather initiates a single RAB establishment procedure. This saves time which would normally be used to activate or modify several PDP contexts.

In general, both described embodiments of the invention provide a technique in which, for the establishment of multiple logical connections between a user equipment and a network over a radio interface, the radio access resources are established in a single step.

Although the present invention has been specifically described in relation to a 3G mobile communications network, a person skilled in the art will appreciate that the invention is not so limited in its general applicability.

Specifically, the present invention is not limited in its applicability to logical connections on the basis of PDP contexts. Nor is the present invention limited to networks using a SGSN or a GGSN for establishing logical connections.

The present invention is applicable for circuit switched and packet switched applications, including GPRS.

The present invention is described herein with reference to examples of preferred embodiments for the purpose of illustration, and is not limited to any such embodiments. The scope of the present invention is defined by the appended claims.

The invention claimed is:

1. A method comprising:
  receiving a first packet data protocol context request which includes an indication of whether a further packet data protocol request follows at a first network element;
  responsive to receiving said first packet data protocol context request at the first network element, transmitting a second packet data protocol context request from the first network element to a second network element;
  receiving at least one packet data protocol context response from said second network element in reply to said second packet data protocol context request;
  determining whether a further packet data protocol context is to follow from said first packet data protocol context at the first network element and if so, carrying out said receiving of the first packet data protocol context request, said transmitting of the second packet data protocol context request, and said receiving of the at least one packet data protocol context response;
  receiving all the required packet data protocol context requests; and
  responsive to receiving all the packet data protocol context responses, the first network element transmitting to a third network element a radio access bearer establishment request for radio access bearers required for the packet data protocol context requests;
  receiving from the third network element a response message providing information on the required radio access bearers in reply to said radio access bearer establishment request; and
  responsive to receiving said response message from the third network element, the first network element transmitting an activate packet data protocol context accept message.

2. The method of claim 1, where the radio access bearers have different levels of service.

3. The method of claim 1, where the radio access bearers carry different media components.

4. The method of claim 3, where the media components comprise one or more of video, voice or data.

5. A system comprising:
  at least one user equipment means for determining a number of packet data protocol context requests required;
  a first network means for receiving a first packet data protocol context request which includes an indication of whether a further packet data protocol requests follows so that all the required packet data protocol context requests are received;
  a second network means for receiving a second packet data protocol context request transmitted from the first network element responsive to receiving said first packet data protocol context request, said second network element replying to said second packet data protocol context request with at least one packet data protocol context response;
  a third network means for receiving a radio access bearer establishment request for radio access bearers required for the packet data protocol context requests transmitted from the first network means responsive to receiving at least one packet data protocol context response, and the third network means determining on the basis of the indication that all the required packet data protocol context requests have been received, allocating radio access bearers, and transmitting a response message providing information on the required radio access bearers in reply to said radio access bearer establishment request; and the first network means responsive to receiving said response message from the third network element, is configured to transmit an activate packet data protocol context accept message and establish plurality of packet data protocol contexts.

6. An apparatus comprising:

a receiver configured to receive a first packet data protocol context request which includes an indication of whether a further packet data protocol request follows at a first network element;

a transmitter configured to transmit, responsive to receiving said first packet data protocol context request at the first network element, a second packet data protocol context request from the first network element to a second network element, wherein the receiver is configured to receive at least one packet data protocol context response from said second network element in reply to said second packet data protocol context request; and a processor configured to determine whether a further packet data protocol context is to follow from said first packet data protocol context at the first network element and if so, carrying out said receiving of the first packet data protocol context request, said transmitting of the second packet data protocol context request, and said receiving of the at least one packet data protocol context response, wherein the receiver is configured to receive all the required packet data protocol context requests, and, responsive to receiving all the packet data protocol context responses, wherein the transmitter is configured to transmit to a third network element a radio access bearer establishment request for radio access bearers required for the packet data protocol context requests, wherein the receiver is configured to receive from the third network element a response message providing information on the required radio access bearers in reply to said radio access bearer establishment request, and, responsive to receiving said response message from the third network element, the transmitter is configured to transmit an activate packet data protocol context accept message.

7. The apparatus of claim 6, where the radio access bearers have different levels of service.

8. The apparatus of claim 6, where the radio access bearers carry different media components.

9. The apparatus of claim 8, where the media components comprise one or more of video, voice or data.

\* \* \* \* \*